United States Patent [19]
Fujioka

[11] Patent Number: 5,751,446
[45] Date of Patent: May 12, 1998

[54] IMAGE READING DEVICE FOR ACCURATELY READING SPREAD PAGES OF A BOOK DOCUMENT

[75] Inventor: Tetsuya Fujioka, Yokohama, Japan

[73] Assignee: Ricoh Company, Ltd., Tokyo, Japan

[21] Appl. No.: 437,372

[22] Filed: May 9, 1995

[30] Foreign Application Priority Data

| May 12, 1994 | [JP] | Japan | 6-124506 |
| May 16, 1994 | [JP] | Japan | 6-101418 |
| Nov. 17, 1994 | [JP] | Japan | 6-283374 |

[51] Int. Cl.$^6$ .................. H04N 1/04; H04N 1/40; G03B 27/32
[52] U.S. Cl. .................. 358/474; 358/449; 358/497; 358/494; 355/25; 355/82; 399/362
[58] Field of Search .................. 358/474, 401, 358/449, 488, 497, 494; 355/25, 82; 399/362; 382/312; 250/208.1

[56] References Cited

U.S. PATENT DOCUMENTS

| 3,594,079 | 7/1971 | Murgas et al. |
| 4,017,173 | 4/1977 | Komori et al. |
| 4,218,130 | 8/1980 | Satomi et al. |
| 4,645,331 | 2/1987 | Berger |
| 4,659,207 | 4/1987 | Maekawa |
| 4,673,286 | 6/1987 | Shinbrot |
| 4,688,930 | 8/1987 | Ohno |
| 4,693,594 | 9/1987 | Garavuso et al. |
| 4,739,372 | 4/1988 | Watanabe ............. 355/25 |
| 4,823,395 | 4/1989 | Chikauchi |
| 4,856,769 | 8/1989 | Andrew et al. |
| 4,916,839 | 4/1990 | Nakanishi |
| 4,942,482 | 7/1990 | Kakinuma et al. |
| 4,965,871 | 10/1990 | Ogura et al. ............. 355/55 |
| 4,972,271 | 11/1990 | Koumura |
| 4,982,235 | 1/1991 | Fujino |
| 4,985,617 | 1/1991 | Ogushi |
| 5,077,577 | 12/1991 | Hamakawa |
| 5,084,732 | 1/1992 | Tsaur et al. |
| 5,119,136 | 6/1992 | Morikawa |
| 5,325,213 | 6/1994 | Takahashi et al. |
| 5,362,958 | 11/1994 | Ando ............. 250/208.1 |
| 5,471,277 | 11/1995 | Fujioka et al. ............. 355/25 |
| 5,479,262 | 12/1995 | Namiki et al. ............. 358/296 |
| 5,572,284 | 11/1996 | Fujioka ............. 399/362 |
| 5,583,662 | 12/1996 | Takahashi et al. ............. 358/474 |
| 5,585,926 | 12/1996 | Fujii et al. ............. 358/474 |
| 5,610,720 | 3/1997 | Fujioka et al. ............. 358/296 |
| 5,616,914 | 4/1997 | Matsuda ............. 250/208.1 |

FOREIGN PATENT DOCUMENTS

| 54-21836 | 2/1979 | Japan |
| 60-122932 | 7/1985 | Japan |
| 61-184527 | 8/1986 | Japan |
| 62-99737 | 5/1987 | Japan |
| 4-48867 | 2/1992 | Japan |
| 6-250296 | 9/1994 | Japan |

Primary Examiner—Edward L. Coles, Sr.
Assistant Examiner—Tia M. Harris
Attorney, Agent, or Firm—Oblon, Spivak, McClelland, Maier & Neustadt, P.C.

[57] ABSTRACT

An image reading device for an image forming apparatus and capable of reading the spread pages of a book document laid on a table. Even with a book document of the kind bound by staples or wire and provided with a cover by pasting, i.e., whose spread size is smaller than two times of the cover size, the device is capable of producing attractive copied images or read images with ease by obviating black stripes at the bound portion, image displacement, image intrusion, local image omission, and needless image data.

11 Claims, 15 Drawing Sheets

LEFT PAGE EDGE REF.

→ SCANNING DIRECTION (x1 READ IMAGE)

SHADOW OF BOUND PORTION $D = 2A - 2C \ (\times 1)$
$D' = 2(2A - 2C) \ (200\% \ \text{ENLARGE})$
$D'' = (2A - 2C)/2 \ (50\% \ \text{REDUCE})$

SHADOW OF BOUND PORTION

IMAGE READING DEVICE FOR ACCURATELY READING SPREAD PAGES OF A BOOK DOCUMENT

BACKGROUND OF THE INVENTION

1. Field of the Invention

The present invention relates to an image reading device for a copier, facsimile apparatus or similar image forming apparatus and, more particularly, to an image reading device capable of reading the spread pages of a book document laid on a document table.

2. Discussion of the Background

An image shifting technology has been customary with an image reading device in relation to the adjustment of a binding margin. For example, Japanese Patent Laid-Open Publication No. 2-81064 teaches the following image shifting procedure. When a document to be copied is placed on the predetermined surface of an electrophotographic apparatus, a paper size sensing section senses the size of the document and that of a copy paper. Subsequently, after the binding position of the copy sheet has been designated, image data are input. Then, a comparing section determines whether or not the designated binding position overlaps the text of the document. If the former overlaps the latter, but it should only be shifted to one side, a data shifting section shifts the document. In this condition, a printing section prints out the image data together with the positions of binding holes. If the shift brings the text out of the copy paper, a data reducing section reduces the document image. This is followed by the shifting and printing steps.

However, the image shifting procedure described above is not satisfactory alone. Specifically, assume a single page mode in which a book document is held in a spread position and read page by page by the reading device. Then, the conventional procedure, lacking image separating means, cannot operate effectively and suffers from the local omission and displacement of images. Further, the procedure needs the comparing section which increases the processing time and complicates the construction. In addition, this kind of device cannot deal with enlargement.

Japanese Patent Laid-Open Publication No. 3-262376 discloses a method of correcting the position of image information in relation to an image reading device. In accordance with this method, as soon as a document is read via a scanner position, one corner of the document is detected in terms of coordinates. This position information is transferred to an image processor together with image data. In the image processor, a position calculating section calculates the position of the input document on the basis of the coordinates. Then, it calculates how much the image information should be moved upward or downward or rightward or leftward to reach an accurate position. A shifting section executes conversion on the basis of the result of calculation and thereby shifts the image information on a document frame. This method, however, also lacks image separating means and has the problems stated above.

To copy or read a book document, there are available, but not limited to, the following some different modes:

(1) an independent mode wherein the image reading device deals with a spread book page by page;

(2) a spread mode wherein the device processes the two spread pages of the book at a time;

(3) a spread two-side mode wherein the device processes the spread two pages as a front and a rear; and (4) a document two-side mode wherein the device sequentially deals with the front and rear of a leaf in exactly the same manner as the original front and rear of the book.

Let book documents be classified into a booklet or thin book document (i) bound by a covered binding and pasted at the ends of the bound portion or provided with a backbone by pasting, a book document (ii) bound by staples or wire and provided with a cover by pasting, and other book documents (iii). As shown in FIGS. 11A and 11B, the booklet (i) can be spread substantially to the deepest position of the bound portion without regard to the page. Hence, assuming that the cover has a size A, then the spread size of the booklet (i) has a size Am which is substantially double the size A (Am=2A). This kind of book document can be successfully read in any of the above modes (1)–(4).

However, as shown in FIGS. 12A and 12B, the book document (ii) has its spread position limited by the staples or wire. As a result, the two spread pages each have a size C smaller than the size A of the cover. Also, the spread size Am' is smaller than two times of the cover size (Am'<2A). When the book (ii) is copied or read in this condition, various problems are brought about in each of the modes (1)–(4), as follows. Assume that the left edge of the left page is a reference, and that the spread book is sequentially read from the reference toward the right page.

In the mode (1), assume that the optimal paper size for ×1 magnification is A×B. FIG. 13 shows image data read from the book document (ii) by a copier or an image scanner. As shown, the copier or image scanner recognizes part of the right page as appearing in the left page, recognizes the beginning of the right page as appearing halfway in the actual right page, and recognizes the end portion of the right page as being an image derived from needless data (e.g. a black solid image attributable to the background color or non-reflective space, another document, or a cover plate). When such image data are enlarged or reduced with the edge of the left page as a reference, the resulting image is also partly lost or includes a blank portion, as shown in FIG. 14. Consequently, as shown in FIGS. 15A and 15B, the shadow of the bound portion appears in the left page because it exceeds the erasure range available with the conventional erasure, frame erasure or similar technology. Also, it is likely that the image of the right page is displaced to the upstream side (toward the left page), or that the image of the right page partly appears in the left page or partly disappears due to excessive displacement (FIGS. 16A and 16B). Further, in the right zone D of the right page (D=2A–2C for ×1 magnification; D'=2(2A–2C) for 200% enlargement; D"=(2A –2C)/2) for 50% reduction), an image attributable to the above-mentioned occurrence appears.

In the mode (2), as shown in FIGS. 17, 18 and 19, when a copier or an image scanner reads the book document (ii), the center of the paper of the optimal size (indicated by a solid triangle) and that of the image (indicated by a blank triangle) are deviated from each other. Further, the portion scanned last is recognized as an image derived from needless data due to the previously mentioned cause. As a result, as shown in FIG. 20, the shadow of the bound portion appears at a position deviated from the center of the paper.

With the binding margin erasing function proposed in previously mentioned Laid-Open Publication No. 4-273767, it is possible to erase an image over a desired width at a desired position in the subscanning direction. However, this is not practicable without resorting to means for inputting a desired center position and means for inputting a desired width. These extra means increase the overall size of the device and complicate the manual operation. For this reason, relatively simple center erase processing is predominant which erases the center of a paper over a designated width. Other problems to occur when the book document (ii) is read in the mode (2) are as follows. The edge of the right page appears because it is excessively displaced and cannot be dealt with by the conventional center erase processing or frame erase processing. The images of the two spread pages are displaced to the upstream side in the scanning direction (toward the left page). In the right end zone D of the paper (D =2A–2C for ×1 magnification; D'=2(2A–2C) for 200% enlargement; D"=(2A–2C)/2) for 50% reduction), an image attributable to the above-mentioned occurrence appears.

In the mode (3) as shown in FIGS. 13 and 14, when a copier or an image scanner reads the document (ii), the copier or scanner recognizes part of the right page as appearing in the left page, recognizes the beginning of the right page as appearing halfway in the actual right page, and recognizes the end portion of the right page as being an image derived from needless data (e.g. black solid image attributable to the background color or non-reflective space, another document, or a cover plate). As a result, as shown in FIG. 15 (the left page and the right page respectively turning out the front and the rear), the shadow of the bound portion appears in the vicinity of the right edge of the front image. Also, the rear image is displaced to the upstream side in the scanning direction (toward the left page). Further, the rear image (right page) partly appears in the front image or partly disappears due to the excessive displacement thereof. In addition, in the right end zone D of the rear of the image of the right page (D=2A–2C for ×1 magnification; D'=2(2A–2C) for 200% enlargement; D"=(2A–2C)/2) for 50% reduction), an image attributable to the above-mentioned occurrence appears.

In the mode (4), as shown in FIGS. 13 and 14, when a copier or an image scanner reads the book document (ii), the copier or scanner recognizes part of the right page as appearing in the left page, recognizes the beginning of the right page as appearing halfway in the actual right page, and recognizes the end portion of the right page as being an image derived from needless data (e.g. a black solid image attributable to the background color or non-reflective space, another document, or a cover plate). As a result, as shown in FIGS. 15A and 15B (the right page and the next left page respectively turning out the front and the rear), the front image of the right page is displaced to the upstream side (toward the left edge). Further, the front image (image of the next right page) partly appears in the rear image (image of the left page), or the front image (image of the right page) partly disappears due to excessive displacement (the right page of FIGS. 16A and 16B and the next left page respectively turning out the front and the rear). Further, in the right end zone D of the front of the image of the right page (D=2A–2C for ×1 magnification; D'=2(2A–2C) for 200% enlargement; D"=(2A–2C)/2) for 50% reduction), an image attributable to the above-mentioned occurrence appears. In addition, the shadow of the bound portion appears in the vicinity of the right edge of the rear image of the left page.

Other documents relating to an image reading device are as follows:

Japanese Patent Laid-Open Publication No. 4-48867
Japanese Patent Laid-Open Publication No. 6-250296
Japanese Patent Laid-Open Publication No. 61-184527
Japanese Patent Laid-Open Publication No. 62-99737
Japanese Patent Laid-Open Publication No. 54-21836
Japanese Patent Laid-Open Publication No. 61-284492
Japanese Patent Laid-Open Publication No. 56-60294
Japanese Patent Laid-Open Publication No. 60-122932
Japanese Patent Laid-Open Publication No. 63-47197
Japanese Patent Laid-Open Publication No. 62-35891
Japanese Patent Laid-Open Publication No. 62-267196
Japanese Patent Laid-Open Publication No. 57-208300

| U.S. Pat. No. 4,693,594 | U.S. Pat. No. 5,325,213 |
| U.S. Pat. No. 4,017,173 | U.S. Pat. No. 4,218,130 |
| U.S. Pat. No. 4,659,207 | U.S. Pat. No. 4,673,286 |
| U.S. Pat. No. 4,688,930 | U.S. Pat. No. 4,916,839 |
| U.S. Pat. No. 4,942,482 | U.S. Pat. No. 4,972,271 |
| U.S. Pat. No. 5,077,577 | U.S. Pat. No. 5,084,732 |
| U.S. Pat. No. 4,982,235 | U.S. Pat. No. 4,856,769 |
| U.S. Pat. No. 4,985,617 | U.S. Pat. No. 5,119,136 |
| U.S. Pat. No. 4,823,395 | U.S. Pat. No. 3,594,079 |
| U.S. Pat. No. 4,645,331 | |

SUMMARY OF THE INVENTION

It is, therefore, an object of the present invention to provide a miniature and inexpensive image reading device capable of readily producing an attractive copied or read image even with a book document bound by staples or wire and provided with a cover by pasting, by eliminating a black stripe attributable to a bound portion, displacement or intrusion of an image, local omission of an image, and an image attributable to needless data.

In accordance with the present invention, an image reading device has a table for loading a book document in a spread position, a reading unit for reading images from the spread pages of the book document by sequentially scanning them, a storage for storing image data output from the reading unit, a detecting section for detecting the overall length of the book document in a direction perpendicular to the bound portion of the book document, a selecting circuit for selecting an optimal regular read paper size on the basis of the overall length, a determining circuit for determining a difference between the overall length and the dimension of the optimal regular read paper size corresponding to the length, and a controller for controlling the reading range of the reading unit and the image data in response to the output of one of the detecting sectopm, selecting circuit, and determining circuit.

Also, in accordance with the present invention, an image reading device has a table for loading a book document in a spread position, a reading unit for reading images from the spread pages of the book document by sequentially scanning them, a storage for storing image data output from the reading unit, a detecting section for detecting the positions of edges of the spread pages parallel to and remote from the bound portion of the book document, and an image processing circuit for processing the image data stored in the storage. The image processing circuit reads, based on a read start address and a read end address produced from the positions of the edges by calculation, the image data out of the storage, divides the image data into the image data of the left page and the image data of the right page at the center, shifts the left page to the left and the right page to the right, and selectively enlarges or reduces the image data toward the bound portion by using the edges remote from the bound portion as a reference.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

The operation of the image reading device in accordance with the present invention will be outlined first.

Detection of Overall Length of Spread Book

The opposite edges of a spread book are detected to determine a reference address X1 and an end address X2. The overall length A of the spread book is produced by:

$$A = X2 - X1$$

Detection of Read Paper Size & Difference of Length

A read paper size is selected on the basis of the length A of the spread book and document size data input beforehand. For example, if A is 410 mm, the read paper size is determined to be A3 (or A4 in terms of a single page). Then, B is determined to be 420 mm on the basis of the dimension of the corresponding sides of a paper of A3 size. The difference C between the lengths B and A is produced by:

$$C = 420 - 410 = 10 \text{ mm}$$

Subsequently, the following values are sequentially produced:

$$A/2 = 410/2 = 205 \text{ mm}$$

$$B/2 = 420/2 = 210 \text{ mm}$$

$$(B+C)/2 = (420+10)/2 = 215 \text{ mm}$$

Likewise, when A is 350 mm, the read paper size is determined to be B4 (or B5 in terms of a single page). B is determined to be 364 mm on the basis of the dimension of the corresponding sides of a paper of B4 size. As a result, C is produced by:

$$C = 364 - 350 = 14 \text{ mm}$$

Then, the following values are sequentially produced:

$$A/2 = 350/2 = 175 \text{ mm}$$

$$B/2 = 364/2 = 182 \text{ mm}$$

$$(B+C)/2 = (364+14)/2 = 189 \text{ mm}$$

These values are also used by a printer in selecting a paper size.

Figure 21:
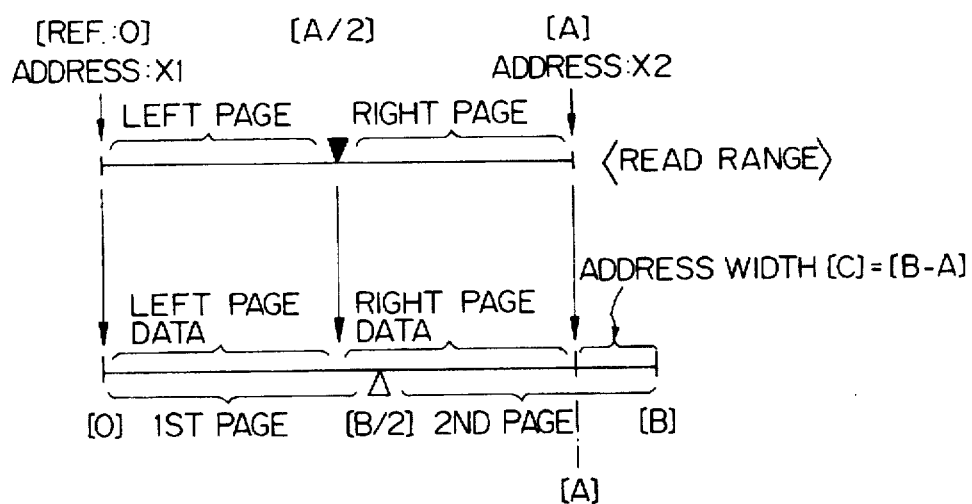
FIG. 21 shows a relation between the reading range of the book document and the memory area.

Storage of Image Data in Frame Memory (1) At the beginning of the first image reading, only the address X1 is detected. Hence, image data are sequentially read from the address X1 (reference address; 0 (zero)) and sequentially written to a frame memory up to the address X2 (A as distinguished from the reference address 0). At this instant, the image data have been written to the frame memory up to the memory address A (FIG. 21). At this instant, the detection of the overall length of the spread document and the detection of the read paper size and difference described above are executed.

Figure 22:
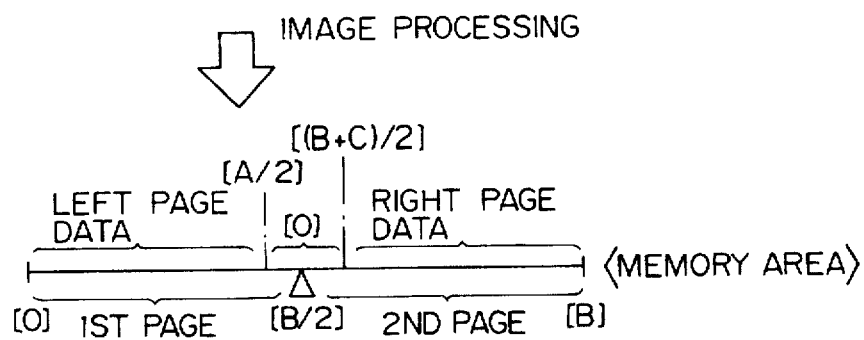
FIG. 22 shows a relation between another reading range of the book document and the memory area.

Subsequently, the stored image data derived from the first scanning are processed. Specifically, the image data of the memory addresses A/2 to A are shifted to the memory addresses (B+C)/2 to B. Further, the image data of the memory addresses A/2 to (B+C)/2 are rewritten to logical ZEROs (representative of white image data as distinguished from image data represented by logical ONEs) (FIG. 22). Alternatively, the data of the memory addresses A/2 to (B+C)/2 may be dealt with as "no image data" and stored after compression.

The image data may be transferred from the frame memory to, for example, a printer either on a single page basis or on a spread pages basis, as desired. In a single page scheme, the first page is output from the memory address 0 to the memory address B/2, and then the second page is output from the memory address B/2 to the memory address B. In a spread pages scheme, all the image data of the memory addresses 0 to B are output at a time.

Figure 25:
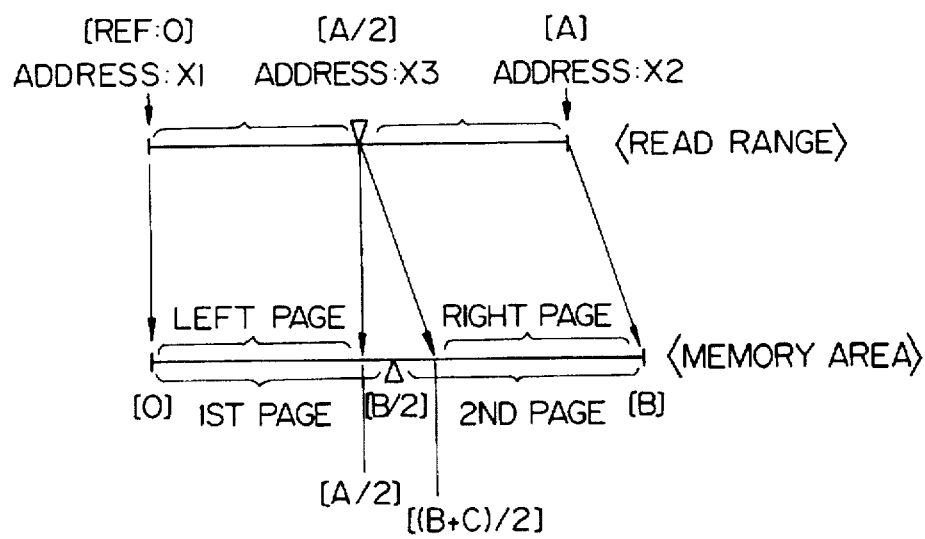
FIG. 25 shows a relation between still another reading range and the memory area.

(2) At the time of the second reading and onward, the addresses X1 and X2 and various parameters have already been known. Hence, to reduce the image processing time, the first page is read from the address X1 (reference address; 0) and sequentially written to the frame memory from the memory address 0. The first page is read up to an address (scanning address) X3. Subsequently, the address pointer is shifted to (B+C)/2, and the second page is read from the address X3 while being sequentially written to the memory from the memory address (B+C)/2. The second page is read up to the address (scanning address) X2. As a result, the image data are written to the memory up to the memory address B. Thereafter, the stored image data derived from the second scanning and onward are processed. Specifically, the image data from the memory address A/2 to the memory address (B+C)/2 are rewritten to ZEROs (FIG. 25). Again, the data of the memory addresses A/2 to (B+C)/2 may be dealt with as "no image data" and stored after compression, if desired.

In the single page scheme, the first page is read from the memory address 0 to the memory address B/2 and transferred to a printer or the like. The second page is read from the memory address B/2 to the memory address B and transferred to the printer. On the other hand, in the spread pages scheme, the image data are read from the memory address 0 to the memory address B.

In the event of enlargement or reduction, the image data produced by the first reading and the image data produced by the second reading and onward, respectively undergone the procedures of FIGS. 22 and 25, are processed as follows.

Figure 23:
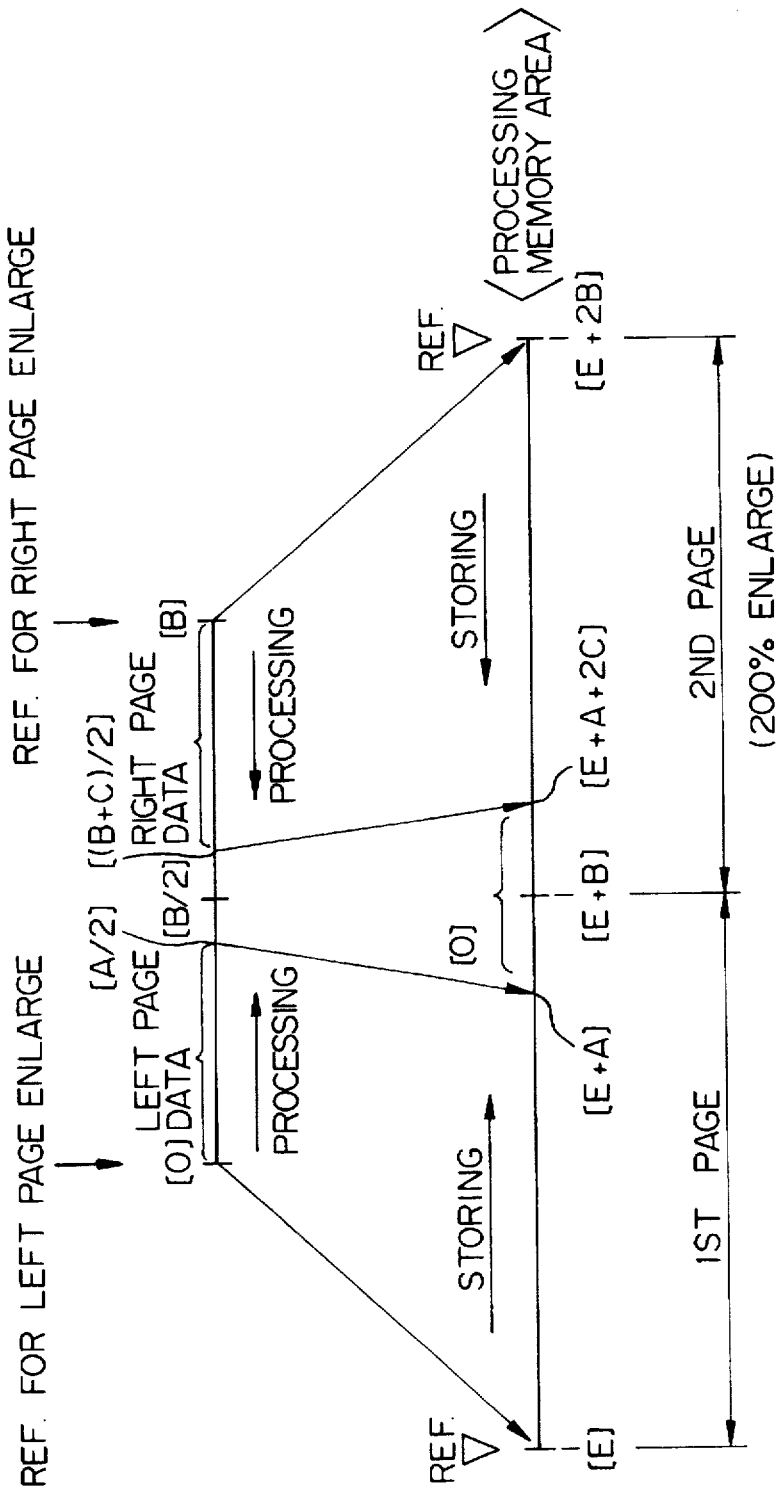
FIG. 23 shows a relation between the reading range and the memory area in the enlargement mode.

As shown in FIG. 23, for an enlargement ratio of 200%, the image data of the left page and stored in the memory addresses 0 to A/2 are sequentially enlarged in this order. The enlarged image data are sequentially written to the memory address E and successive addresses of an area assigned to memory processing. The image data of the right page and stored in the memory addresses (B+C)/2 to B are sequentially enlarged from the memory address B in the reverse order (toward the memory address (B+C)/2). The enlarged image data are sequentially written to the memory address E+2B and successive addresses in the reverse order (toward the memory address E+B). Further, the image data lying in the range of from E+A to E+A+2C are rewritten to ZEROs representative of white data. Again, these data may be dealt with as "no image data" and stored after compression.

The 200% enlarged image data are transferred to, for example, a printer either on a single page basis or on a spread pages basis, as follows. In the single page scheme, the first page is output from the memory address E to the memory address E+B of the image processing area. The second page is output from the memory address E+B to E+2B. In the spread pages scheme, the image data are output from the memory address E to the memory address E+2B.

Figure 24:
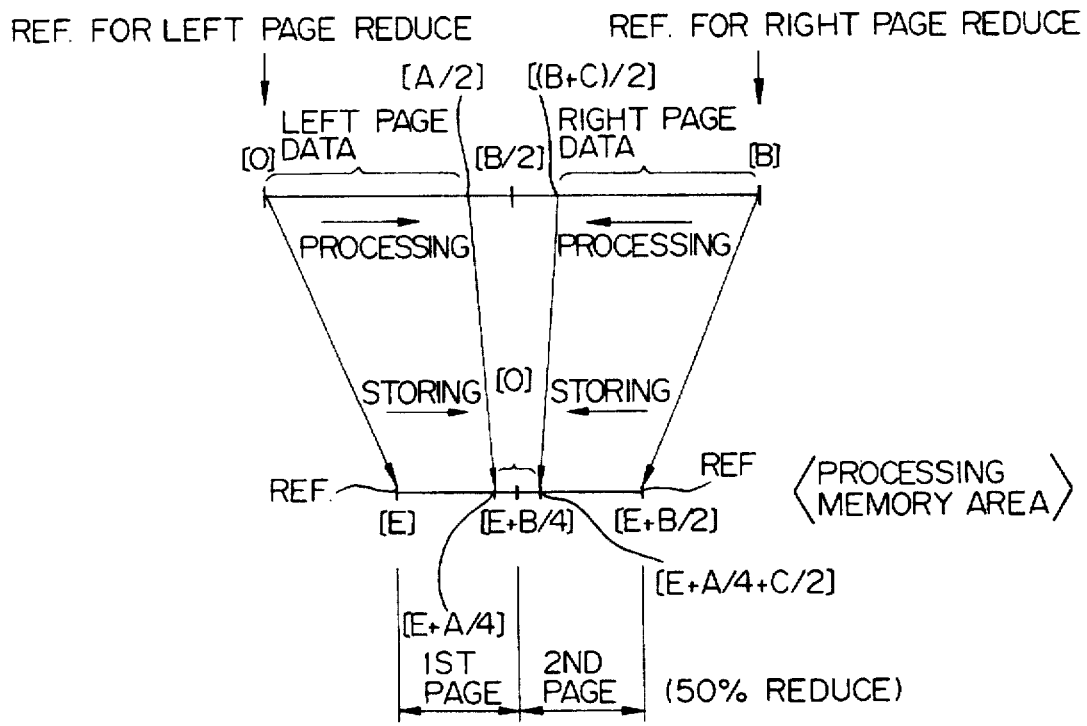
FIG. 24 shows a relation between the reading range and the memory area in the reduction mode.

As shown in FIG. 24, for a reduction ratio of 50%, the image data of the left page and stored in the memory addresses 0 to A/2 are sequentially reduced in this order and sequentially written to the memory address E and onward of the image processing area. The image data of the right page and stored in the memory addresses (B+C)/2 to B are sequentially reduced in the reverse order, i.e., from the address B (toward the memory address (B+C)/2). The reduced data of the right page are sequentially written to the memory from the memory address E+(B/2) in the reverse order (toward the memory address E+B/4). Further, the image data of the addresses E+(A/4) to E+(A/4)+C/2 are rewritten to ZEROs representative of white image data. Alternatively, these data may be dealt with as "no image data" and stored after compression, if desired.

In the single page scheme, the 50% reduced image data of the first page are transferred to, for example, a printer from the memory address E to the memory address E+(B/4). The image data of the second page are transferred to the printer from the memory address E+(B/4) to the memory address E+(B/2). In the spread pages scheme, all the image data stored in the memory addresses E to E+(B/2) are transferred to the printer at a time.

The first page and the second page are respectively recognized as the image of the left page and the image of the right page. This is also true when the image of the left page and the image of the right page are output from the frame memory via a printer or an interface.

Figure 1:
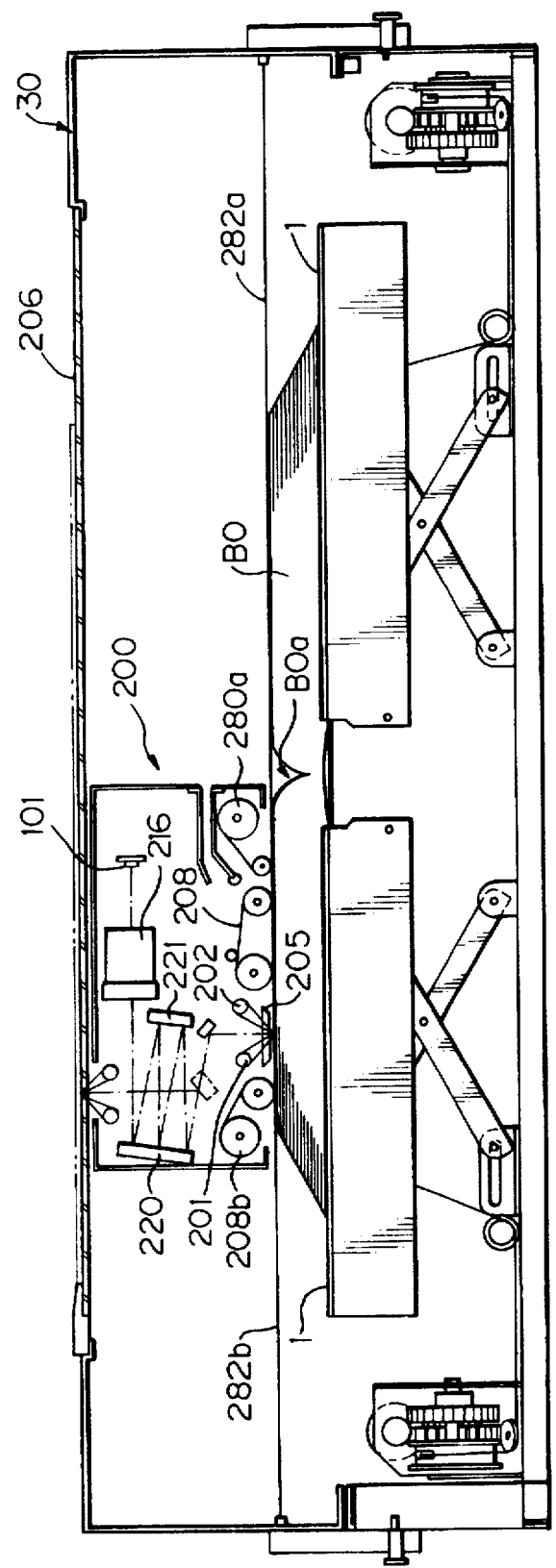
FIG. 1 is a section showing the general construction of an image reading device embodying the present invention.

Referring to FIG. 1 of the drawings, an image reading device embodying the present invention is shown and implemented as a TPS (Turn the Page Scanner). As shown, the TPS has a contact glass 206 mounted on the top of a housing. A sheet document or a book document may be laid on the contact glass 206 and pressed from above by a cover plate, not shown. In this case, after an optical path assigned to the contact glass 206 has been selected, a scanning unit or carriage 200 scans the document through the platen 206, as will be described specifically later. The upper half of the TPS constitutes a scanner unit 30. The carriage 200 is disposed in the scanner unit 30 and movable in the right-and-left direction as viewed in FIG. 1.

Figure 2:
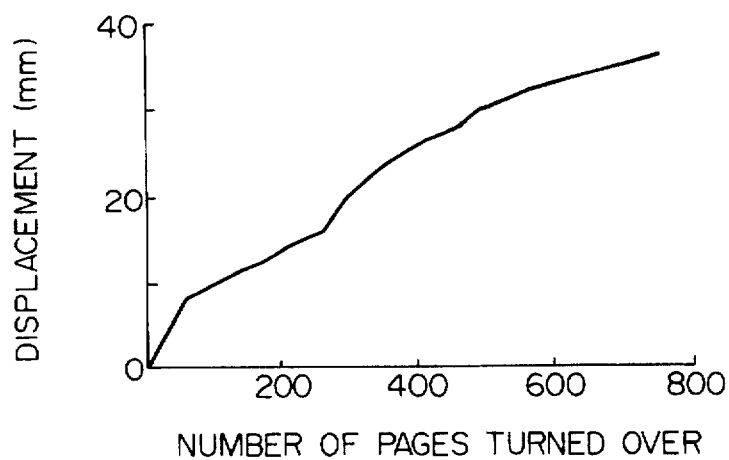
FIGS. 2–4 are graphs each showing a relation between the displacement of the left edge of a spread book document having a particular thickness and particular number of pages and the number of pages turned over.
Figure 3:
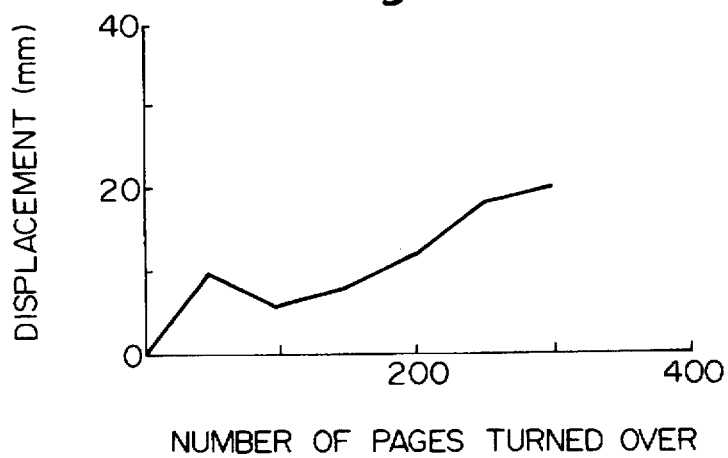
Figure 4:
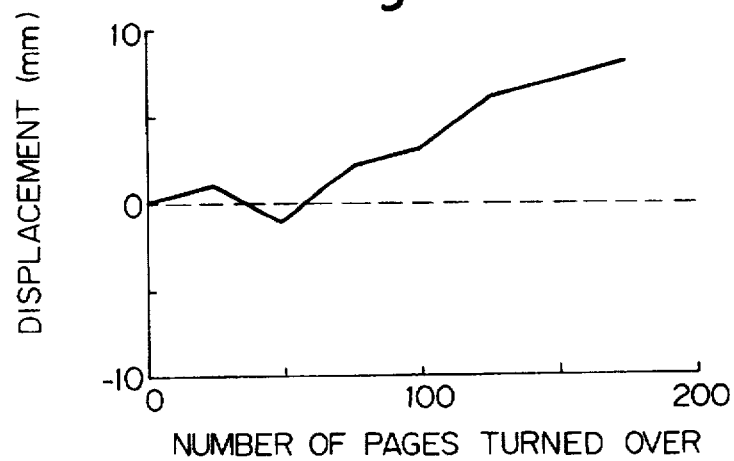
Figure 26:
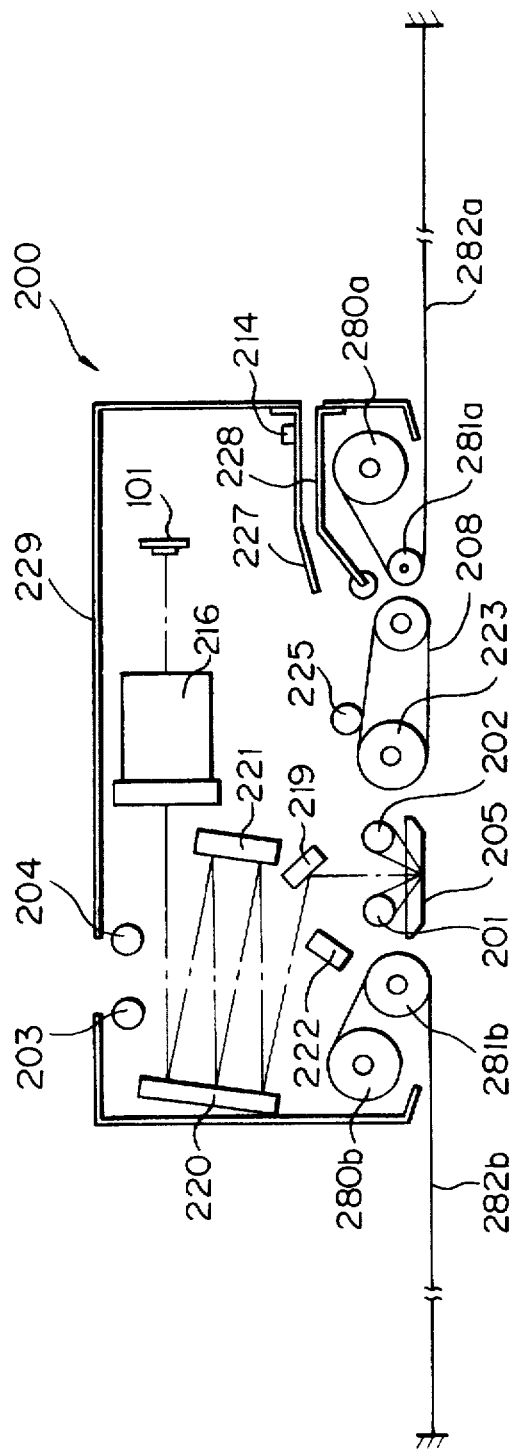
FIG. 26 is a section showing a scanning unit included in the embodiment.

FIG. 26 shows how the scanning unit 200 reads a book document spread such that the right and left pages thereof face upward, while turning the pages thereof. As the unit 200 repeatedly turns the pages of the spread book, the number of left pages sequentially increases. As a result, assuming the position of a cover as a reference, the edge of the left page generally rises from the left to the right. At the same time, the edge of the right page generally falls from the left to the right. FIGS. 2-4 each show a particular relation between the number of pages turned over and the displacement of the left edge of the left page. In these figures, it is assumed that the left edge of the spread book is initially located at a position "0" and sequentially shifted to the right in an amount represented by a displacement. Specifically, the displacement of the left edge to the right is assumed to be positive (plus) and shown in millimeters.

FIGS. 2, 3 and 4 are respectively indicative of a case wherein the book is 20 mm thick and has 750 pages, a case wherein the book is 12 mm and has 300 pages, and a case wherein the book is 9 mm thick and has 180 pages. The book is assumed to have a size B4 in a spread position. As shown, the left edge of the document does not always change monotonously because the bound portion or center of the spread book changes in shape. Further, as FIGS. 3 and 4 indicate, the displacement locally decreases, rather than increases, because the bound portion of the book slides in the right-and-left direction during the course of page turning; the displacement even occurs to the left (negative direction), as shown in FIG. 4. In addition, the displacement depends even on the size, thickness and material of the book.

In the illustrative embodiment, the book document is fixed in a spread position on document tables 1 (FIG. 1). Although this minimizes a sharp change due to the movement of the backbone of the book, the spread pages sequentially change in position due to page turning and cause the image reading position and page turning position to be displaced. As for the upward displacement of the book, every time the scanning unit 200 scans the book, the tables 1 are unlocked and resiliently urged against the carriage 200. Hence, the top pages are automatically maintained at a constant level. In accordance with the present invention, the displacement of the edges of the book is corrected by changing the leading and trailing edges of an image and the page turning position during the course of repeated page turning operations.

It has been customary for a controller to detect the edges of a spread book on the basis of a document size entered or represented by a scanned image. For example, each edge of a spread book of size A3 is about 210 mm remote from the center set position in terms of the image sensor position, and about 30 mm remote from a second home position assigned to the carriage 200. The address X1 of a start position for the first scanning is detected. The second scanning and onward will be described later. The controller, started operating the carriage 200 at a home position, starts writing image data in an image memory at a position several millimeters short of the edge of the spread book. In the event when the image data are output, the controller indicate the edge of the document as the start position of a valid image area in the subscanning direction.

Figure 5:
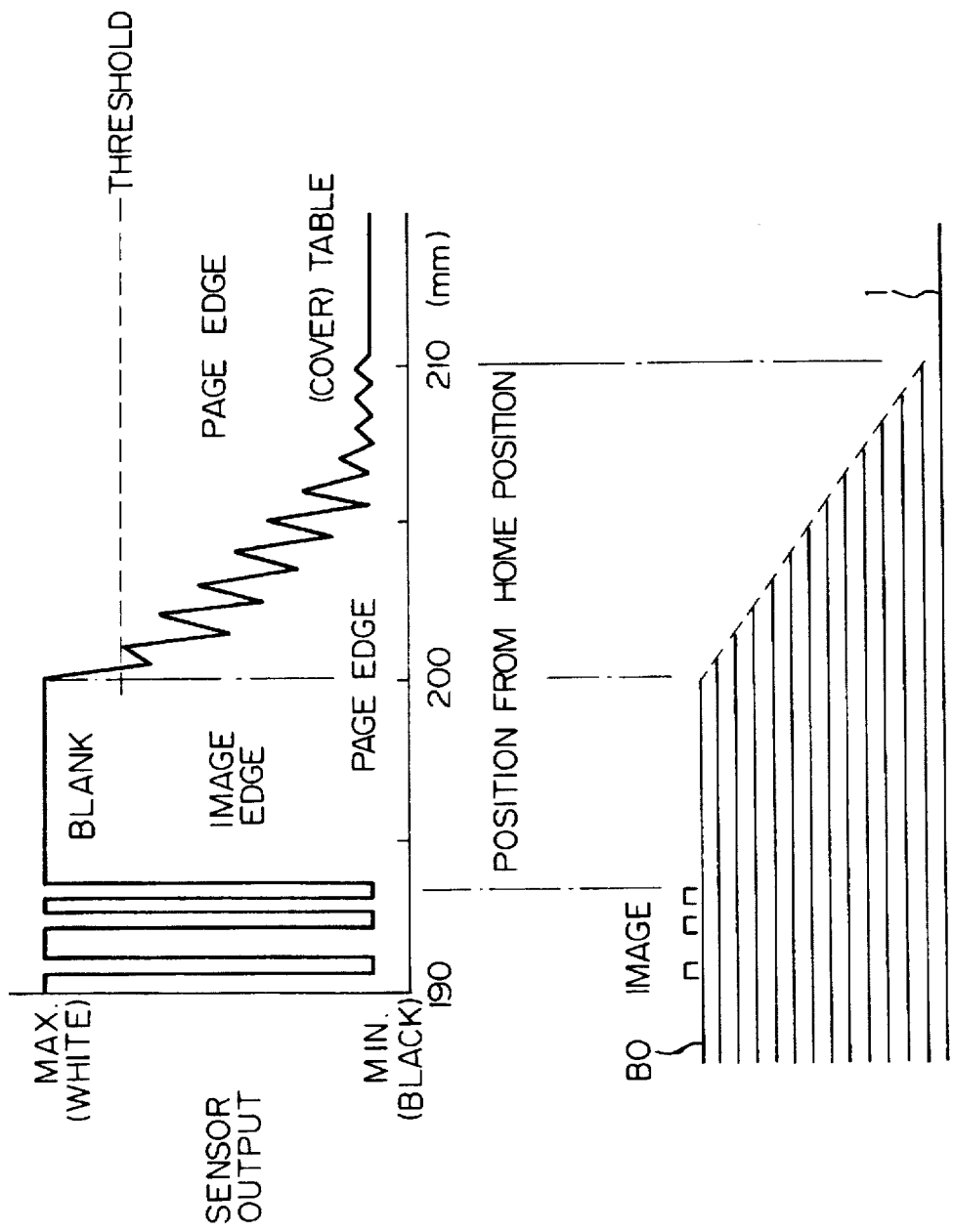
FIG. 5 shows data read by an image sensor included in the embodiment from a book document.
Figure 6:
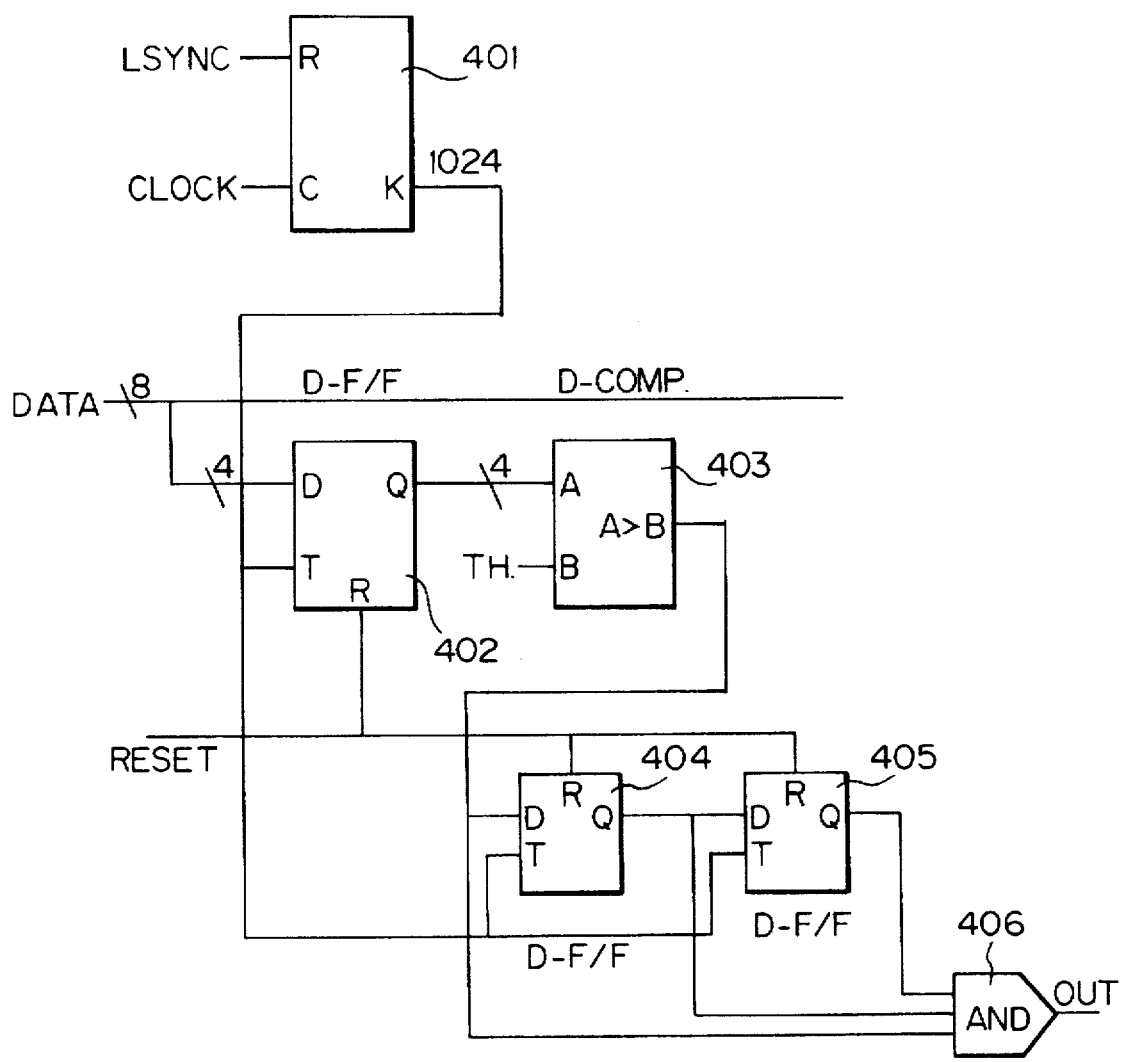
FIG. 6 is a block diagram schematically showing a circuit included in the embodiment for detecting the edges of a book document.
Figure 9:
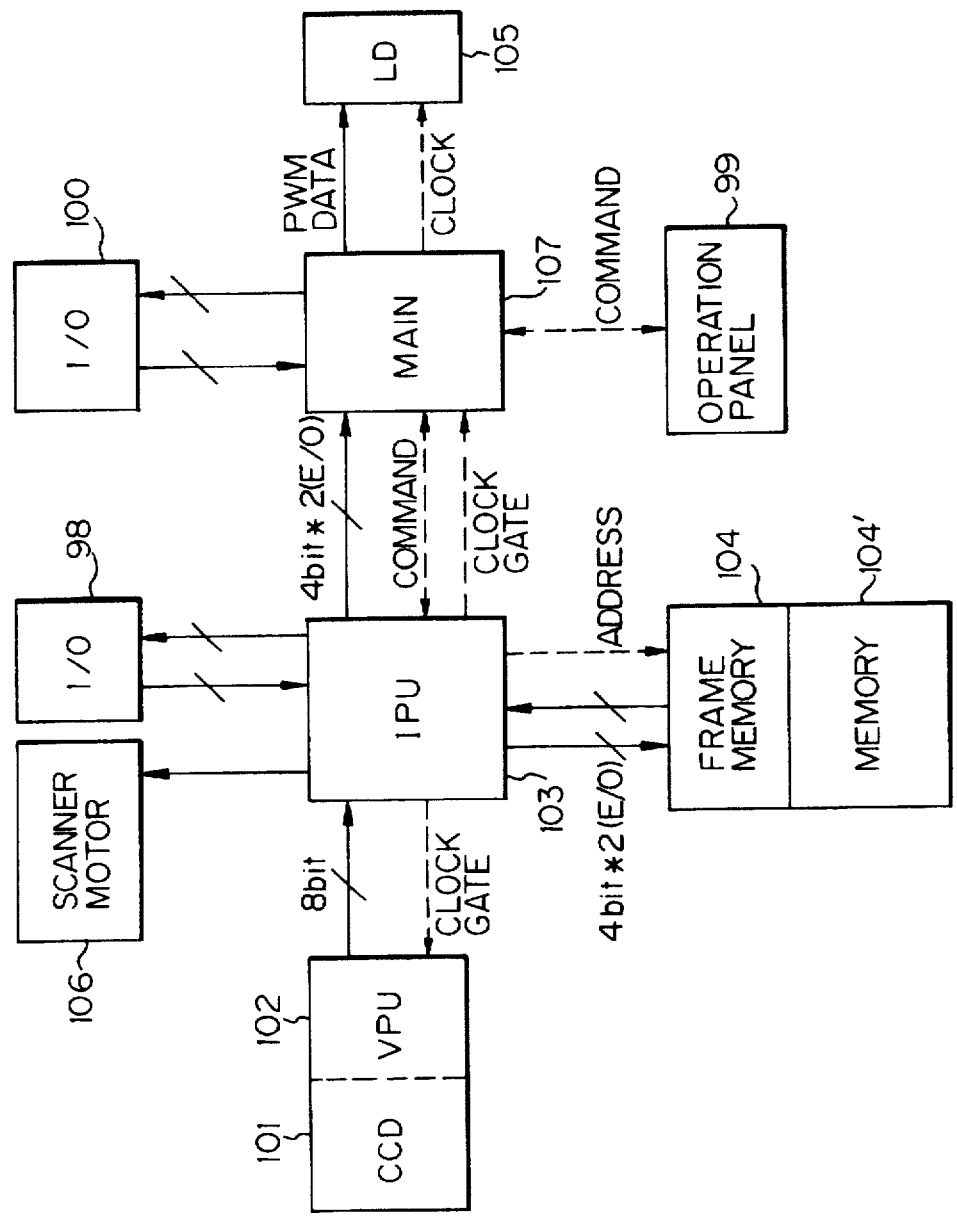
FIG. 9 is a block diagram schematically showing an image reading section of a system implemented by the present invention.

How the right edge of the spread book in the subscanning direction is detected will be described. FIG. 5 shows data representative of the right edge portion of the spread book and generated by a CCD (Charge Coupled Device) image sensor 101 before the first page turning. As shown, the right edge of the book, having a size of A3 in the spread position, is about 210 mm remote from the center set position in terms of the position of the image sensor 101. The edge in the subscanning direction is detected on the basis of a change, in the subscanning direction, in the information read by a particular pixel of the image sensor 101. As for a particular pixel in the main scanning direction, because the reference for the spread book is located at the front and corresponds to the minimum document size, the 1,024th pixel 64 mm remote from the front CCD reference is sampled every main scanning line by a counter 401 and a data latch 402 (FIG. 6). Among the resulting eight bits of data, four bits are applied to a digital comparator 403 and compared with a threshold thereby. The threshold is set by a microcomputer included in an IPU (Image Processing Unit) 103 (FIG. 9)

In FIG. 6, the result of comparison from the comparator 403 is delayed by D flip-flops 404 and 405. The outputs of the D flip-flops 404 and 405 are fed to an AND gate 406. When the data of the particular pixel of the image sensor 101 is greater than the threshold over three consecutive pixels in the subscanning direction, the AND gate 406 generates a detection signal and sends it to the controller.

To detect the edge, the scanning unit 200 starts scanning to the left from the right scanning end, i.e., from the black document table 1 or a frame thereof. The controller cancels a reset signal RESET assigned to the start of detection. The image sensor 101 senses a stripe continuous in the main scanning direction and formed by the edge of the cover or that of a leaf, and then senses image information rightward of the edge of the top page randomly.

Generally, a book has a white background and carries no images over more than ten millimeters as measured from the edge. In light of this, when a white uniform color appears greater than the threshold, the controller determines it to be a margin. For accurate decision, use may be made of the data of a plurality of pixels of the image sensor 101 in the main scanning direction. If desired, four or more pixels may be used for the decision, or the threshold for comparison may be changed in matching relation to a system or a document applied.

Consequently, in the specific condition shown in FIG. 5, the right edge of the spread document is determined to be 200 mm remote from the home position.

Figure 7:
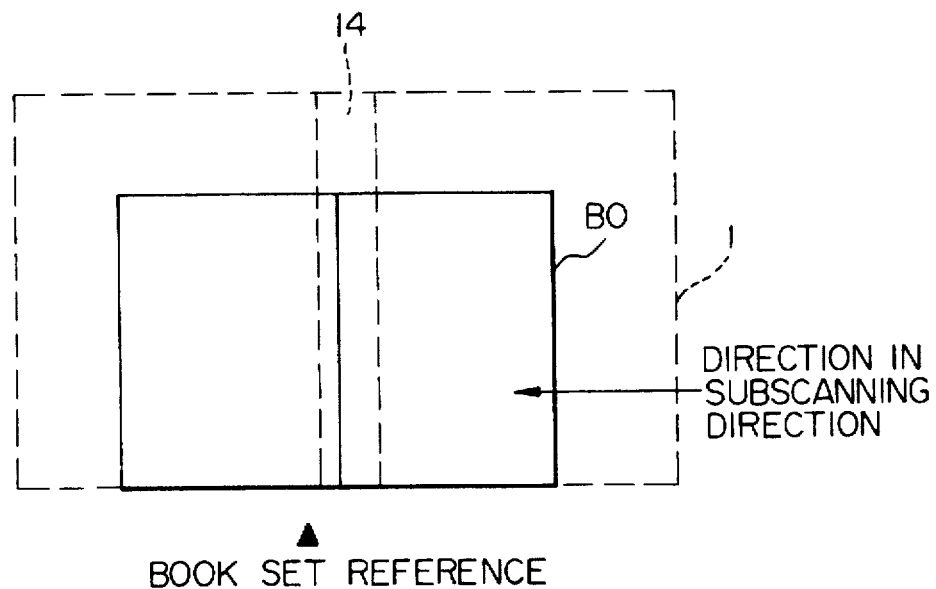
FIG. 7 is a plan view showing a specific condition wherein a book document is set on the device.

As shown in FIG. 7, a spread book BO is fixed in place at the front of the document tables 1 with the left edge of its bound portion aligned with the center.

The trailing edge of the spread book in the subscanning direction is detected by a page sensor 415 (FIG. 8), as follows. After the first page turning, the edge of the page is detected by calculating the edge position of the top page accurately and stably by use of the page sensor 415. In the illustrative embodiment, the document is scarcely displaced because its front and rear covers are fixed to the tables 1. In addition, the book suffers from a minimum of displacement when one page is turned over.

Figure 8:
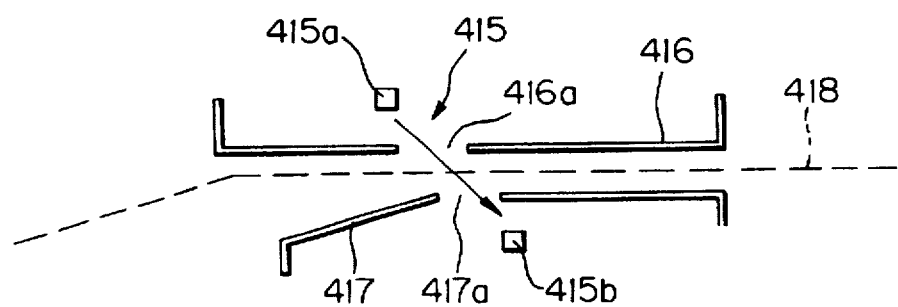
FIG. 8 is a side elevation of an arrangement included in the embodiment for sensing a leaf introduced into a page receiving portion.

Specifically, as shown in FIG. 8, the page sensor 415 is a transmission type sensor and made up of an LED (Light Emitting Diode) 415a and a photodiode 415b. The LED 415a is positioned above an upper page guide 416 while the photodiode 415b is positioned below a lower page guide 417. The page guides 416 and 417, forming a conveyance path 418 therebetween, are formed with holes 416a and 417a, respectively. The LED 415a and photodiode 415b face each other obliquely to a vertical extending through a sensing position. Hence, paper dust due to the leaves of the book is caused to drop and prevented from accumulating at the sensing position. The page sensor 415 senses a leaf after it has been lifted and conveyed via the guides 416 and 417. The accuracy available with the page sensor 415 is as high as 1 mm or less in terms of scattering without regard to the kind of a document. The page sensor 415 also plays the role of a sensor responsive to the defective turning of a leave, i.e., a jam.

As shown in FIG. 26, the scanning unit 200 reads the spread pages of the book BO and then moves to the left to turn over the page. The leaf of the book BO is sequentially received in the unit 200 along a substantially constant locus which is mechanically determined. Specifically, as soon as the top right leaf of the book BO is electrostatically adhered to a turn belt 208, the movement of the unit 200 is once stopped. At the same time, the turn belt 208 is lifted to bring the leaf toward the conveyance path. Subsequently, the movement of the unit 200 is resumed with the result that the leaf is guided to the outside of the unit 200 along the conveyance path. The page sensor 415 is positioned in the vicinity of the inlet of the conveyance path or page receiving portion.

The position of the scanning unit 200 at the time when the page sensor 415 starts sensing the leaf is determined. The determined position of the unit 200 is used to calculate the position of the right edge of the page when it was laid on the book BO. Hence, by sensing the edge of the separated leaf with the page sensor 415, it is possible to surely and accurately determine the position of the edge of the page to be turned over (right edge in the embodiment). Because the trailing edge of the valid image range of the spread book and the book itself are each scarcely displaced when one page is turned over, the next page turning position is calculated and corrected.

How the leading edge of the spread book in the subscanning direction is detected is as follows. When the scanning unit 200 picking up the leaf is further moved to the left, the leaf is sequentially pulled by the bound portion of the book BO out of the conveyance path along a U-shaped locus. This locus is also substantially constant due to the configuration of the conveyance path and the presence of a press roller 281a. The position of the unit 200 at the time when the discharge of the leaf from the conveyance path is detected is determined. The determined position of the unit 200 is used to calculate the position of the left edge of the book on which the leaf is expected to lie. Hence, by detecting the edge of the separated leaf, it is possible to surely and accurately detect the position of the edge of the page (edge of the first page or reference position in the embodiment) in the document reading direction (leftward in the embodiment). As a result, the leading edge of the valid image range is determined and used for registration at the next image scanning.

The valid image range of the spread book has a start address (reference address) X1 and an end address X2 as calculated by the above procedure. The intermediate X3 between the two addresses X1 and X2 is representative of the bound portion of the spread book and is produced by:

$$X3=(X1+X2)/2$$

This provides a reference position for the two spread pages read at a time to be divided at the time of copying. Further, the above procedure surely erases the image of the bound portion where shades and distortions are apt to occur.

As stated above, although the positions of the two spread pages each changes due to repeated page turning, the displacement due to the turn-over of one page is extremely small. Further, even when page turning is repeated ten times, the displacement is less than 1 mm and scarcely displaces the image (registration for copying). Considering this, the embodiment calculates the leaf picking position once every time the paging turning is repeated a plurality of times, e.g., ten times. As a result, the position data is updated periodically in order to reduce the arithmetic operation and time.

The basic TPS operation will be described specifically hereinafter.

Book Mode (a) When a book key is pressed, a book mode is set up.

(b) When a print key is pressed, the tables 1 are raised to urge a spread book against the carriage 200.

(c) A mirror 222 is retracted, and lower fluorescent lamps 201 and 202 are turned on.

(d) The carriage 200 is moved to the left. After the carriage 200 has reached a left home position, there are executed shading correction and automatic gain control.

(e) The carriage 200 is moved to the right to read an image. At the same time, the carriage 200 reads a spread image in order to detect the left edge of the book on the basis of a density distribution.

(f) The carriage, moving to the right, detects the right edge of the book on the basis of a difference in density between the page and the table 1.

(g) After the carriage 200 has reached the rightmost position, the turn belt 208 begins to be charged. Then, the carriage 200 is moved to the left.

(h) When the turn belt 208 arrives at the detected right edge of the book, the carriage 200 is once brought to a stop, and the turn belt 200 is raised. On the elapse of a predetermined period of time, the carriage 200 is again moved to the left.

(i) The main scanning range of the document is detected, and then the automatic erasing position in the up-and-down direction is calculated. Subsequently, the lower lamps 201 and 202 are turned off.

(j) On the elapse of a predetermined period of time after the lift of the leaf, the carriage 200 is moved to the left.

(k) The right edge of the right page is accurately calculated on the basis of the position where the page sensor has started sensing the leaf introduced into the conveyance path. Also, whether or not the leaf has been successfully picked up is determined.

(1) When the carriage 200 is brought to the center, the right and left tables 1 are once unlocked in the up-and-down direction, and the right table 1 is once unlocked in the right-and-left direction. As a result, the spread position of the book is determined.

(m) When the turn belt 208 arrives at the center of the book, the charging of the belt 208 is interrupted.

(n) The carriage 200 is moved to the left. The position of the left edge of the left page is accurately calculated on the basis of the position where the page sensor has started sensing the discharge of the leaf. Subsequently, the center position and length of the spread pages are calculated on the basis of the right and left edges of the spread pages.

(o) After the calculation, the address of a frame memory 104 is designated on the basis of the detected positions, output format, and erasure information. Data are read out of the frame memory 104 in response to a synchronizing signal from the printer and transferred to the printer.

(p) After the carriage 200 has reached the left home position, the lower lamps 201 and 202 are turned on so as to effect shading correction and automatic gain control.

(q) The carriage 200 is moved to the right to read the spread pages. The resulting data are processed and then written to the frame memory 104.

(r) After the carriage 200 has read the spread pages up to the right edge, the lower lamps 201 and 202 are turned off. Immediately after the processed data have been written to the frame memory 104, the address of the memory 104 is designated on the basis of the detected positions, output format and erasure information. Then, the data are read out of the memory 104 and transferred to the printer.

(s) Thereafter, the steps (f), (h) and (j)-(n) for page turning and the steps (p)-(r) for image reading are repeated. The steps (g), (i) and (o) are not executed for the second scanning and onward.

(t) After the repeated movement of the carriage 200, the carriage 200 is brought to the center home position by way of the left home position and stopped there.

The flow of data to occur in the system is as follows. FIG. 9 shows an arrangement for delivering the images read by the TPS to an electrophotographic printer. The system is generally made up of an image reading section, an image data processing section, and an image forming section. An image reading board is mounted at the right end of the carriage 200 and includes the CCD image sensor 101. The image sensor 101 generates an analog image signal. A VPU (Video Processing Unit) 102 executes various kinds of processing, i.e., from the correction of the analog image signal to the digitization thereof in response to a reference signal from the IPU 103. The VPU 102 delivers to the IPU 103 the image data having eight bits for a dot and synchronous to a clock and main scanning gate signal at a rate of 5 MHz. The IPU 103 executes magnification change or similar desired manipulation as well as electrophotographic quality processing. Finally, the IPU 103 executes tonality processing, including gamma correction, with the image data and thereby transforms them to video data suitable for writing and having four bits for a dot. The output data of the IPU 103 are written to the frame memory 104.

The TPS reads a book document at a rate of 90 mm/sec or reads a sheet document at a rate of 90 mm/sec, while an image is formed at a rate of 180 mm/sec. Considering the difference between the image reading rate and the image forming rate, the embodiment uses a memory 104' (FIG. 9)

assigned to image processing in addition to the frame memory 104 playing the role of a buffer. The frame memory 104 is capable of accommodating one page of A3 size. In a repeat copy mode, the frame memory 104 protects the document from damage because the same data should only be read out from the memory 104 a desired number of times. In a page continuous mode available for printing the right and left pages independently, it is not necessary to synchronize the scanning to the writing or to repeat an approach run because a single scanning allows the image to be divided into two via the frame memory 104. The frame memory 104, having four bits for a dot, follows the IPU processing due to the adaptability of the IPU 103 as to rate. Because the processed image data are stored, the capacity required of the frame memory 104 is halved, compared to the read image data having eight bits for a dot.

The frame memory 104, implemented by a DRAM (Dynamic Random Access Memory), has 128 megabits capable of accommodating one page of A3 size in terms of 400 dpi (dots per inch) image data. Two dots of image data are input to the frame memory 104 in parallel, and such data are sequentially input at a rate of about 3.8 MHz. Likewise, two dots of image data are output from the frame memory 104 in parallel. The data from the memory 104 are sequentially fed to a main control board 107 at a rate of about 7.5 MHz in synchronism with the clock and main and subscanning gate signals from the IPU 103. In this manner, the memory 104 increases the data rate to one matching the image forming rate of the printer.

The main control board 107 couples the image data from the frame memory 104 into serial data, further increases the rate of the image data by using a FIFO (First In First Out) memory, and synchronizes them to a write clock having a frequency of about 18 MHz. The resulting data, having four bits for a dot, are subjected to PWM (Pulse Width Modulation) and thereby converted to PWM emission time data. The emission time data are sent to an LD (Laser Diode) controller, not shown in synchronism with the write clock. The LD controller, having an LD driver, causes an LD 105 to emit light with the result that a latent image is electrostatically formed on a photoconductive element, not shown.

The IPU 103 controls a scanner motor, or stepping motor, 106 for driving the carriage 200, as follows. The motor 106 drives the carriage 200 at a constant linear velocity of 90 mm/sec when it reads a sheet document or a book document. For magnification change ratios of 71% to 141%, including zooming, the motor 106 drives the carriage 200 at a linear velocity 1.41 times to 0.71 time as high as the above velocity. Further, the motor 106 drives the carriage 200 at a linear velocity of 120 mm/sec when it returns to the scanning start position or turns the page of a spread book. The main control board 107 controls the image forming sequence in response to the outputs of various sensors assigned to image formation, and the outputs of motors, solenoids, clutches, etc.

The image processing particular to the system will b e described specifically. The image sensor 101 is capable of reading an image in about 5,000 pixels or 400 dpi in terms of resolution and reads one line of reflection in the main scanning direction at a time. The image sensor 101 transforms the incident light to an electric signal. The electric signal is subjected to clamping or similar waveform correction, amplification, and analog-to-digital conversion, and then applied to the IPU 103 as a digital signal. The analog data from the image sensor 101 are divided into even data and odd data for high-speed transfer. The even data and odd data are combined into a serial analog signal by a switching IC (Integrated Circuit) implemented as an analog switch. The combined analog signal is transferred at a rate of about 7.5 MHz for a pixel in a book read mode. An analog-to-digital converter (ADC) transforms the analog signal to a digital signal having eight bits and 256 different tones. On the other hand, to correct changes in the quantity of light from the lamps, a variable amplifier has its amplification adequately controlled on the basis of data read from a reference white plate.

Figure 10:
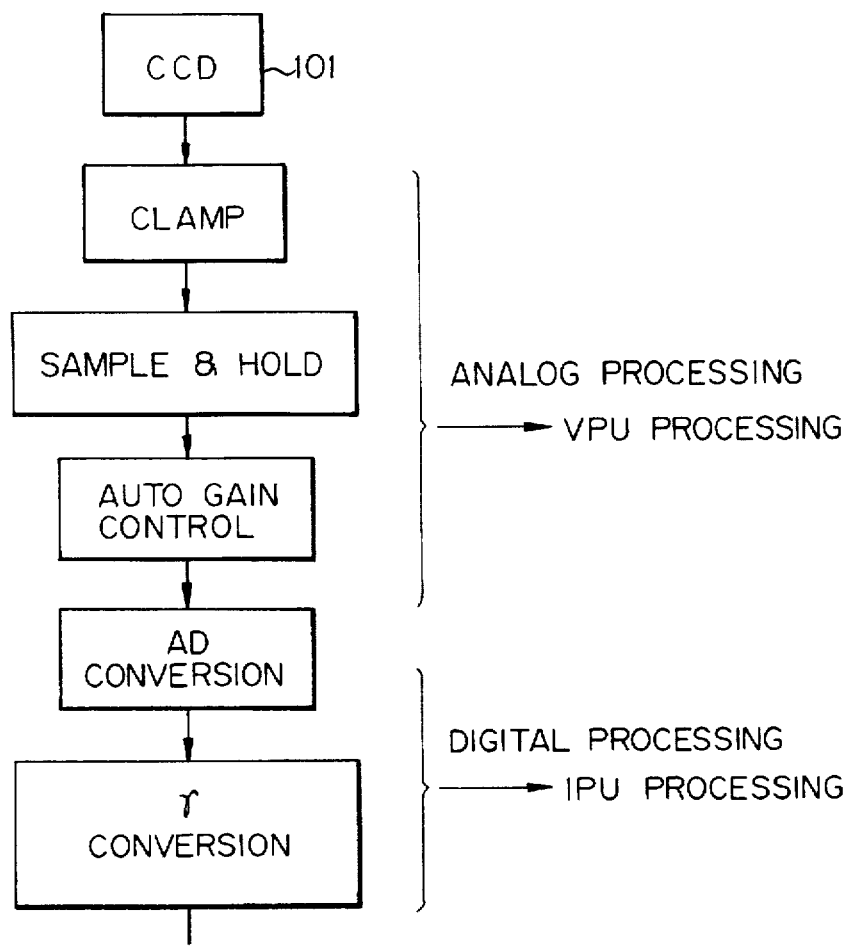
FIG. 10 is a flowchart demonstrating a scanner data processing procedure available with the system of FIG. 9.
Figure 11A:
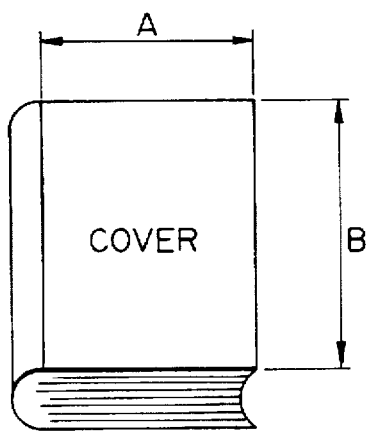
FIGS. 11A and 11B are perspective views showing a specific book document for describing the operation of the present invention.
Figure 11B:
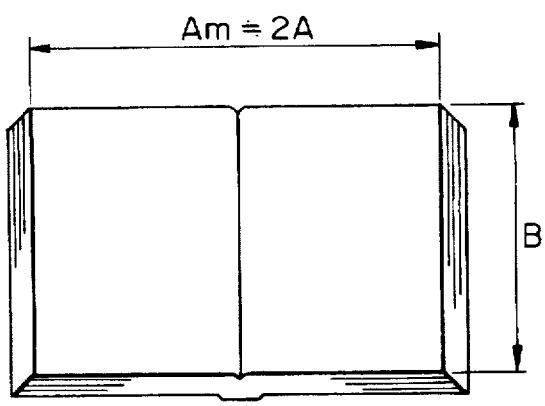
Figure 12A:
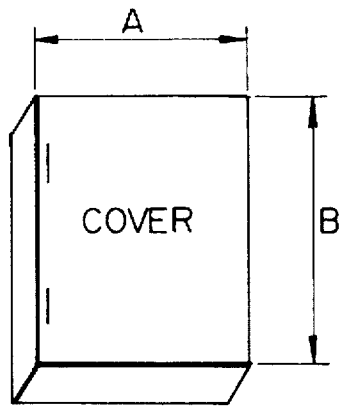
FIGS. 12A and 12B are perspective views showing another specific book document.
Figure 12B:
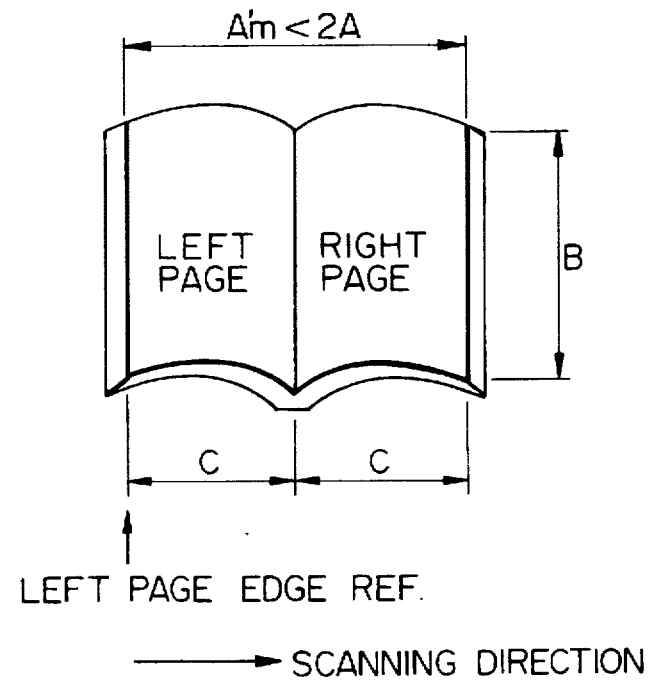
Figure 13:
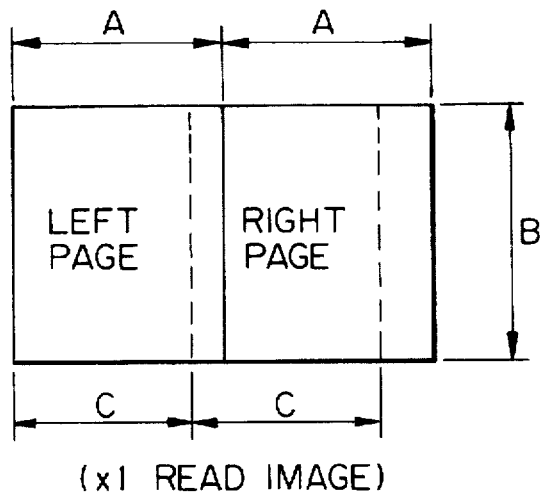
FIG. 13 is a plan view showing the dimensions of the spread book document.
Figure 14:
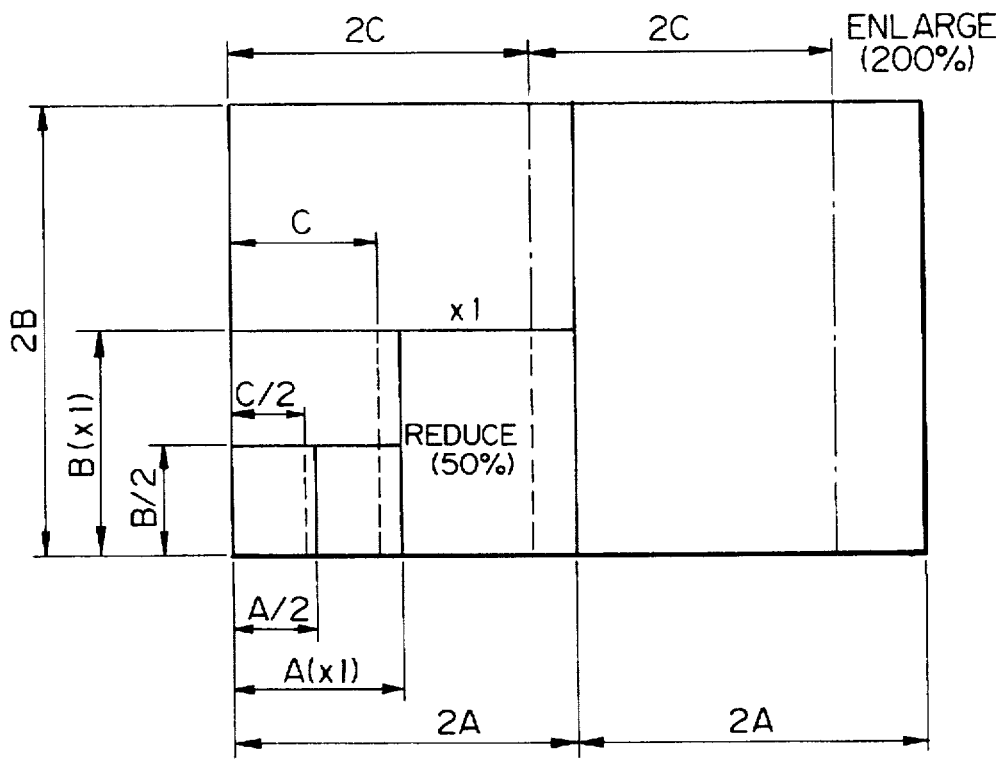
FIG. 14 is a plan view showing the dimensions of the spread book document resulting from enlargement and reduction.
Figures 15A, 15B:
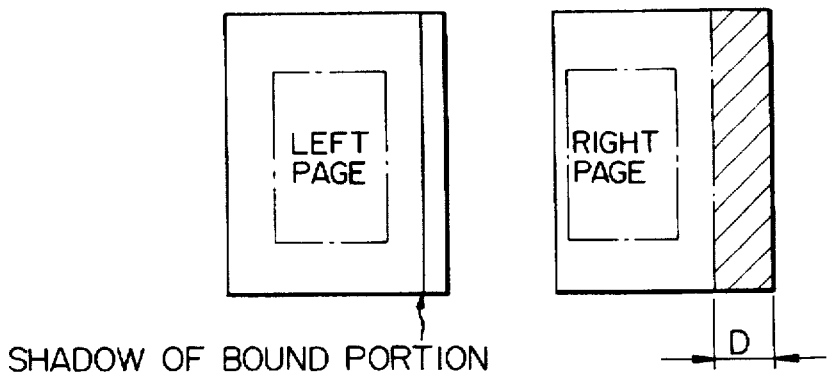
FIGS. 15A and 15B are plan views showing images copied or read from the spread book document.
Figures 16A, 16B:
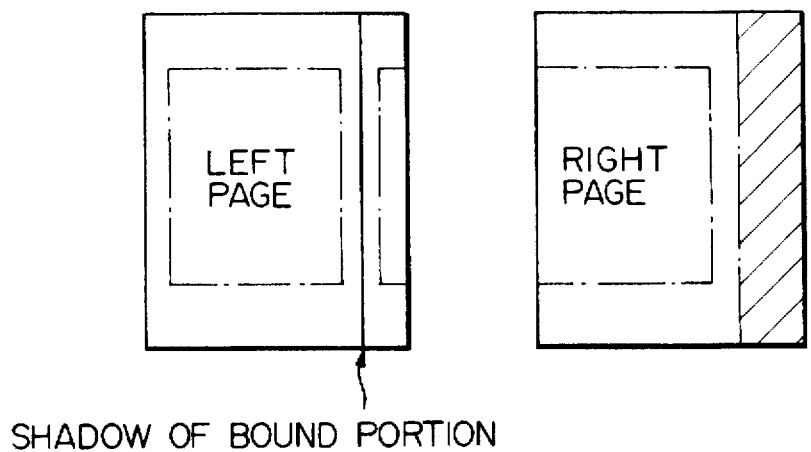
FIGS. 16A and 16B are plan views showing the images copied or read in another mode.
Figure 17:
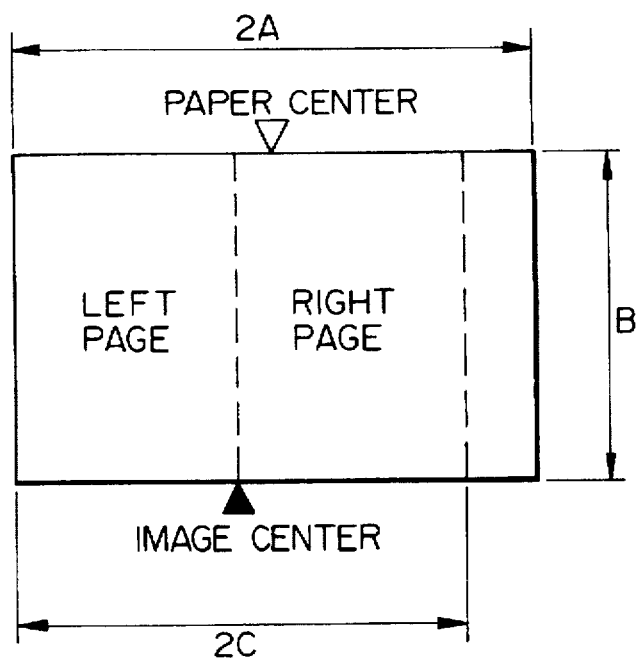
FIG. 17 is a plan view showing other dimensions of the spread book document in a ×1 mode.
Figure 18:
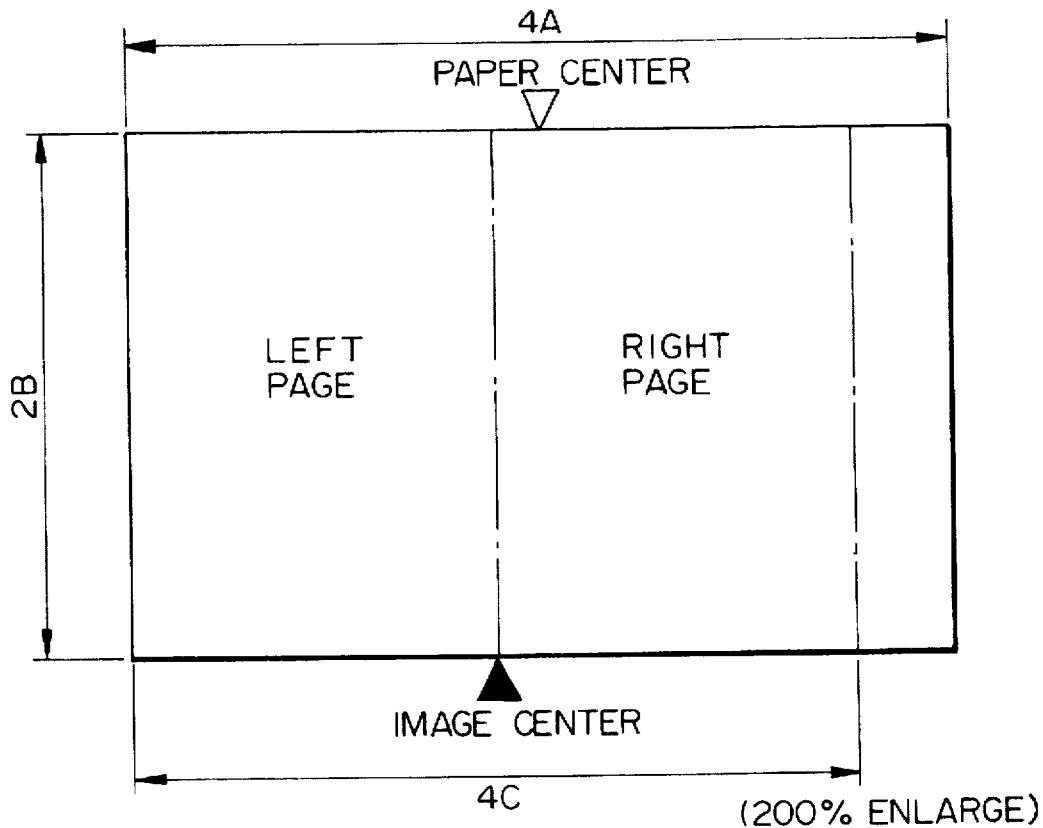
FIG. 18 is a plan view showing other dimensions of the spread book document in an enlargement mode.
Figure 19:
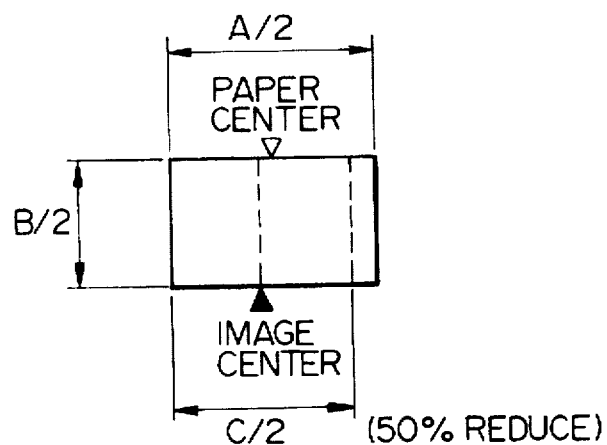
FIG. 19 is a plan view showing other dimensions of the spread book document in a reduction mode.
Figure 20:
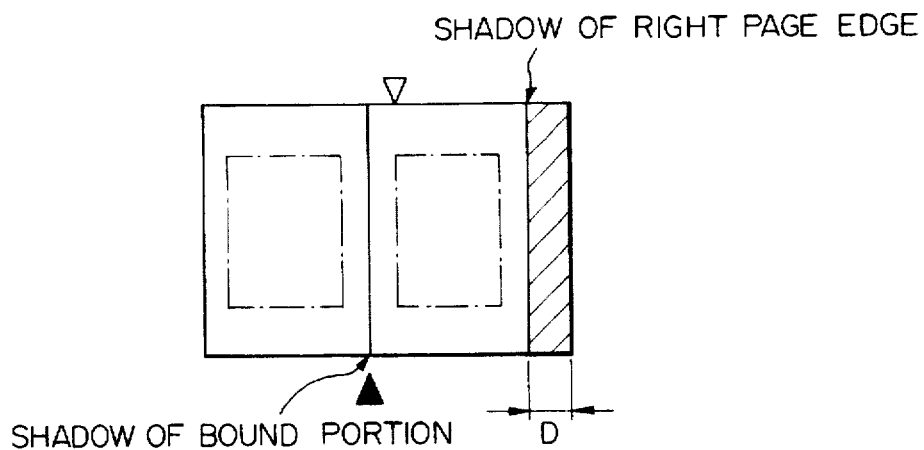
FIG. 20 is a plan view of the images of the spread book document copied or read in still another mode.

How the data from the scanner of the TPS are processed is demonstrated in FIG. 10. As shown, the analog data generated by the image sensor 101 and continuous in the main scanning direction are clamped to have the base level of its waveform adjusted. The clamped data are sampled and held in synchronism with a pixel clock. Subsequently, automatic gain control is effected to change the amplification of the data in matching relation to the quantity of light and data level. Then, the ADC transforms the analog data to eight-bit digital data. The data read by the image sensor 101 and having a linear relation to the reflection density from the document are converted to logarithmic values, so that the tonality is efficiently dealt with in matching relation to the visual sensitivity. The logarithmic conversion is implemented by an LUT (Look-Up Table) having an 8-bit input and an 8-bit output for a dot.

Image Processing

The digital signal, in which each pixel is representative of a particular gray level, is applied to the IPU 103 and processed thereby. The IPU 103, having a plurality of LSIs (Large Scale Integrated circuits), executes processing for high image quality in addition to the image manipulation. Major parts of the processing for high image quality are as follows.

1. Shading Correction

The quantity of light incident to the image sensor 101 is maximum at the center and sequentially decreases toward the periphery due to the linear light sources or lamps and a condensing lens. In addition, the sensitivity of the image sensor 101 is not the same throughout the CCDs. In light of this, the output of the image sensor 101 is corrected on the basis of pixel-by-pixel data read out of a reference white plate.

2. MTF (Modulation Transfer Function) Correction

In an optical system using a lens or the like, peripheral pixel information is read as if it were blurred due to the characteristic of the lens or the like. To eliminate this problem, each pixel data is corrected on the basis of the surrounding levels so as to implement high reproducibility.

3. Magnification Change in Main Scanning Direction

In the illustrative embodiment, the image is read and written by the same resolution of 400 dpi. However, pixels are written to the frame memory 104 at a frequency of about 18 MHz and read out at a frequency of about 15 MHz. Hence, frequency conversion is effected. In addition, the magnification is electrically changed in the main scanning direction within the range of from 71% to 141%. This is calculated by using surrounding pixel data. 4. Gamma Correction Because the gray scale reproduction characteristic (gamma characteristic) of an electrophotographic laser printer is not linear, the gray levels of the document cannot be faithfully reproduced with the raw data. The embodiment changes the quantity of writing light in conformity to the printing characteristic by use of a conversion table. Even in the event of manual gray level adjustment, the quantity of light is changed.

Image Writing

The image data from the IPU 103 are transformed to optical energy by the LD 105. A laser beam from the LD 105 is steered by a polygonal mirror and then incident to a photoconductive element. As a result, a latent image representative of the document image is electrostatically formed on the element. Two different modulation systems, i.e., a pulse modulation system for modulating the duration of illumination in one dot and a power modulation system for modulating the intensity of light are available with the LD 105. The embodiment uses the pulse modulation system in order to achieve high image quality, i.e., high resolution and high tonality.

In summary, it will be seen that the present invention provides an image reading device having various unprecedented advantages, as enumerated below.

(1) The device can detect the positions of images accurately by scanning a book document held in a spread position. This is true even when the book is of the kind bound by staplers or wire and provided with a cover by pasting. Also, the device is capable of detecting the bound portion with accuracy. In addition, the device can control the image reading range simply and accurately on the basis of the position of the bound portion. This implements various kinds of control, reduces the cost, simplifies the structure, and increases the operation speed, thereby enhancing operability and productivity.

(2) The device prevents the second page of the spread book from partly appearing in the first page and thereby surely separates the two pages. This successfully enhances the image quality and ensures attractive images. Moreover, this feature is achievable with a simple, inexpensive and miniature arrangement.

(3) The device generates predetermined image data for the hidden part of the bound portion of the book, i.e., it does not regard it as an indefinite image, an image read in the past, or a noise image. This further enhances the image quality and can be done by a simple and miniature arrangement. In addition, the operator is free from troublesome manipulation.

(4) The second page is prevented from appearing in the first page or from being partly lost. Further, the image of the second page is prevented from being displaced and is surely separated from the first page. As a result, the advantages described in (3) above are also achievable.

(5) The predetermined image data are white image data or dealt with as "no image data". Generally, a book document has a white background or a plain background of low gray level, so that the image of the background is white. The white image data, therefore, provides an attractive image. In addition, because of the absence of image data in such a range, the capacity required of a storage can be reduced. As a result, the configuration is further simplified and reduced in cost.

(6) A read start address and a read end address are calculated on the basis of the edges of the spread book by page edge sensing means. After image data have been read out of the storage on the basis of the two addresses, the data of the left page and those of the right page are separated at the center. The left page data are shifted to the left while the right page data are shifted to the right. The image data are enlarged or reduced toward the bound portion of the spread book. Hence, despite the enlargement or reduction, the images are preventing from being lost or from including unexpected blank portions.

Various modifications will become possible for those skilled in the art after receiving the teachings of the present disclosure without departing from the scope thereof.

What is claimed is:

1. An image reading device comprising:
    a table for loading a book document in a spread position;
    reading means for reading images from spread pages of the book document by sequentially scanning said spread pages;
    storing means for storing image data output from said reading means;
    detecting means for detecting an overall length of the book document in a direction perpendicular to a bound portion of said book document by detecting an edge of a first page of the book document and an edge of a second page of the book document;
    selecting means for selecting an optimal regular read paper size on the basis of the detected overall length;
    determining means for determining a difference between the detected overall length and a dimension of the optimal regular read paper size corresponding to said detected overall length, and for determining a position of the bound portion of the book document from the detected overall length; and
    control means for controlling a reading range of said reading means and the image data in response to an output of one of said detecting means, said selecting means, and said determining means.

2. A device as claimed in claim 1, wherein said reading means scans the spread pages of the book document in said direction perpendicular to the bound portion.

3. A device as claimed in claim 2, wherein assuming that the page to be scanned first and the page to be scanned next are respectively the first page and the second page separated by the bound portion, that the overall length of the book document is A, and that the edge of said first page is a reference position for image reading, said control means controlling the reading range and the image data such that a reading range of said first page is from said reference position to an A/2 position.

4. A device as claimed in claim 3, wherein assuming that the dimension of the paper size corresponding to the length of the spread book document is B, said control means controls the reading range and the image data such that, among the image data representative of the first page, the image data lying in a range of from said reference position to said A/2 position are the image data read by said reading means, and the image data lying in a range of said A/2 position to a B/2 position are predetermined image data.

5. A device as claimed in claim 4, wherein said predetermined image data are white image data or dealt with as no image data.

6. A device as claimed in claim 4, wherein said control means connects the image data of the first page and the image data of the second page and outputs the connected image data as output image data lying in an entire range of the paper size selected by said selecting means.

7. A device as claimed in claim 2, wherein assuming that the page to be scanned first and the page to be scanned next are respectively a first page and a second page separated by the bound portion, that the overall length of the book document is A, and that an edge of said first page is a reference position for image reading, said control means controls the reading range and image data such that a reading range of said second page is from an A/2 position to an A position.

8. A device as claimed in claim 7, wherein assuming that the dimension of the paper size corresponding to the overall length is B, and that the difference between said overall length and said dimension corresponding thereto is C, said control means controls the reading range and the image data such that, among the image data of the second page, the image data lying in a range of from a B/2 position to a (B+C)/2 position are predetermined image data, and the image data lying in a range of from said (B+C)/2 position to a B position are the image data read by said reading means.

9. A device as claimed in claim 8, wherein said predetermined image data are white image data or no image data.

10. A device as claimed in claim 8, wherein said control means connects the image data of the first page and the image data of the second page and outputs the connected image data as output image data lying in an entire range of the paper size selected by said selecting means.

11. An image reading device comprising:

a table for loading a book document in a spread position;

reading means for reading images from spread pages of the book document by sequentially scanning said spread pages;

storing means for storing image data output from said reading means;

detecting means for detecting positions of edges of the spread pages parallel to and remote from a bound portion of the book document by detecting an edge of a first page of the book document and an edge of a second page of the book document; and image processing means for processing the image data stored in said storing means;

wherein said image processing means reads, based on a read start address and a read end address produced from said positions of said edges by calculation, the image data out of said storing means, divides said image data into image data of a left page and image data of a right page at a center, shifts said left page to the left and said right page to the right, and selectively enlarges or reduces the image data toward the bound portion by using said edges remote from said bound portion as a reference.

* * * * *